United States Patent
Zhao et al.

(10) Patent No.: US 10,341,380 B2
(45) Date of Patent: *Jul. 2, 2019

(54) DETECTING MAN-IN-THE-BROWSER ATTACKS

(71) Applicant: Shape Security, Inc., Mountain View, CA (US)

(72) Inventors: Yao Zhao, Fremont, CA (US); Xinran Wang, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,920

(22) Filed: Apr. 23, 2018

(65) Prior Publication Data

US 2018/0241774 A1 Aug. 23, 2018

Related U.S. Application Data

(63) Continuation of application No. 14/861,906, filed on Sep. 22, 2015, now Pat. No. 9,954,893.

(60) Provisional application No. 62/054,295, filed on Sep. 23, 2014.

(51) Int. Cl.
*G06F 21/54* (2013.01)
*H04L 29/06* (2006.01)
*G06F 16/958* (2019.01)

(52) U.S. Cl.
CPC ........ *H04L 63/1466* (2013.01); *G06F 16/958* (2019.01); *G06F 21/54* (2013.01); *H04L 63/1416* (2013.01); *H04L 63/1491* (2013.01); *G06F 2221/2119* (2013.01)

(58) Field of Classification Search
CPC ............. H04L 63/1466; H04L 63/1416; H04L 63/1491; G06F 17/3089
See application file for complete search history.

(56) References Cited

U.S. PATENT DOCUMENTS

| | | | |
|---|---|---|---|
| 9,680,850 B2 | 6/2017 | Rapaport | |
| 2008/0208785 A1* | 8/2008 | Trefler | H04L 67/34 706/47 |
| 2010/0031315 A1 | 2/2010 | Feng | |
| 2010/0257354 A1* | 10/2010 | Johnston | G06F 21/6209 713/153 |
| 2011/0173526 A1* | 7/2011 | Schwarzbauer | G06F 11/36 715/234 |
| 2011/0302424 A1 | 12/2011 | Horne | |
| 2012/0090030 A1 | 4/2012 | Rapaport | |
| 2013/0227394 A1* | 8/2013 | Sazhin | G06F 17/24 715/234 |
| 2014/0259145 A1 | 9/2014 | Khandelwal | |
| 2014/0298469 A1* | 10/2014 | Marion | G06F 21/55 726/23 |
| 2014/0304816 A1* | 10/2014 | Klein | G06F 21/56 726/23 |

(Continued)

OTHER PUBLICATIONS

CTNF, mailed on Oct. 18, 2018, re: Yao Zhao, U.S. Appl. No. 15/959,920, filed Apr. 23, 2018.
U.S. Appl. No. 15/640,399, filed Jan. 4, 2018, Carl Schroder.

*Primary Examiner* — Saleh Najjar
*Assistant Examiner* — Louis C Teng
(74) *Attorney, Agent, or Firm* — Wei & Sleman LLP

(57) ABSTRACT

Methods and apparatus are described for automatically modifying web page code. Specific implementations relate to the modification of web page code for the purpose of combatting Man-in-the-Browser (MitB) attacks.

20 Claims, 5 Drawing Sheets

(56) References Cited

U.S. PATENT DOCUMENTS

| | | | |
|---|---|---|---|
| 2015/0281263 A1* | 10/2015 | McLaughlin | G06Q 30/0248 |
| | | | 726/22 |
| 2016/0119344 A1* | 4/2016 | Freitas Fortuna dos Santos | |
| | | | H04L 63/1466 |
| | | | 726/7 |
| 2018/0091492 A1 | 3/2018 | Hidayat et al. | |
| 2018/0241774 A1 | 8/2018 | Zhao | |

* cited by examiner

DETECTING MAN-IN-THE-BROWSER ATTACKS

PRIORITY DATA

This application claims priority under 35 U.S.C. 119(e) to commonly assigned U.S. Provisional Patent Application No. 62/054,295, titled "Techniques for combatting man-in-the-browser attacks", by Zhao et al., filed on Sep. 23, 2014, which is hereby incorporated by reference in its entirety and for all purposes.

BACKGROUND

Web sites and applications are vulnerable to attack by malicious third parties. In one class of attacks, often referred to as "Man-in-the-Browser" (MitB) or "Web Injection" attacks, malware in a compromised web browser injects malicious code into a web page downloaded by the browser. Such injected malicious code can alter the content of a web page. By way of example, injected code can introduce form fields into a web page that can be used by a malicious third party to steal sensitive information (e.g., user credentials, passwords, social security numbers, etc.). Some technologies, e.g., Web Tripwire and Zarathustra, have been developed to detect injected code, but many of these solutions are easily disabled by malicious third parties and can only detect, not prevent, MitB attacks.

SUMMARY

According to various implementations, methods, apparatus, systems, and computer program products are provided for modifying web page code to combat MitB attacks. According to a particular class of implementations, web page code representing a web page requested by a client device is received. The web page code is modified by transforming a portion of the web page code that includes target code and adding decoy code having one more characteristics of the target code. The one or more characteristics are related to known malware injection points. The modified web page code is transmitted to the client device.

In some implementations, transforming the portion of the web page code includes generating a polymorphic transformation of the portion of the web page code.

According to some implementations, modifying the web page code includes adding monitoring code configured to monitor the decoy code for injected code. According to a specific implementation, a notification is received from the monitoring code that the injected code was detected in the decoy code.

According to some implementations, the decoy code is configured to be obscured when rendered on a browser of the client device. According to a specific implementation, the decoy code is added to a comments section of the web page code.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

This disclosure describes techniques for combating so-called "Man-in-the-Browser" (MitB) or "Web Injection" attacks in which malware in a compromised web browser injects code into a web page downloaded by the browser. Such injected code might be designed to insert extra fields in the web page for the purpose of stealing sensitive user information (e.g., user credentials, passwords, social security numbers, etc.). By way of illustration, certain malware infecting an end user's web browser might be designed to inject code into a login page for a banking web site. Such injected code might cause a "social security number" field to be presented in the browser immediately beneath username and password fields on the login page. Since the social security number field is presented in an otherwise legitimate login page, a user might enter her social security number along with her user name and password, assuming all fields presented are legitimate. Unfortunately, the injected code can cause her social security number to be transmitted to a malicious third party.

According to specific implementations described herein, web page code can be modified for the purpose of combatting MitB attacks. Returning to the example of the preceding paragraph, the web page code of the login page can be hidden from malware using obfuscation techniques, some of which are described below. A "honey object" can be injected into the web page code of the login page. The honey object can include a duplicate, un-obfuscated version of the form elements for the login page. As described below, the honey object can be obscured such that it is detectible by malware but not human users of the banking website. Because the honey object is not presented to users of the banking website, it serves as a decoy, in which injected code can be harmlessly quarantined.

In some implementations, a honey object can also include monitoring code that can generate a notification when malicious code is injected into the honey object. Therefore, the appropriate parties can be automatically notified of a malicious code injection, as described below. Specific implementations will now be described with reference to the accompanying figures.

Figure 1:
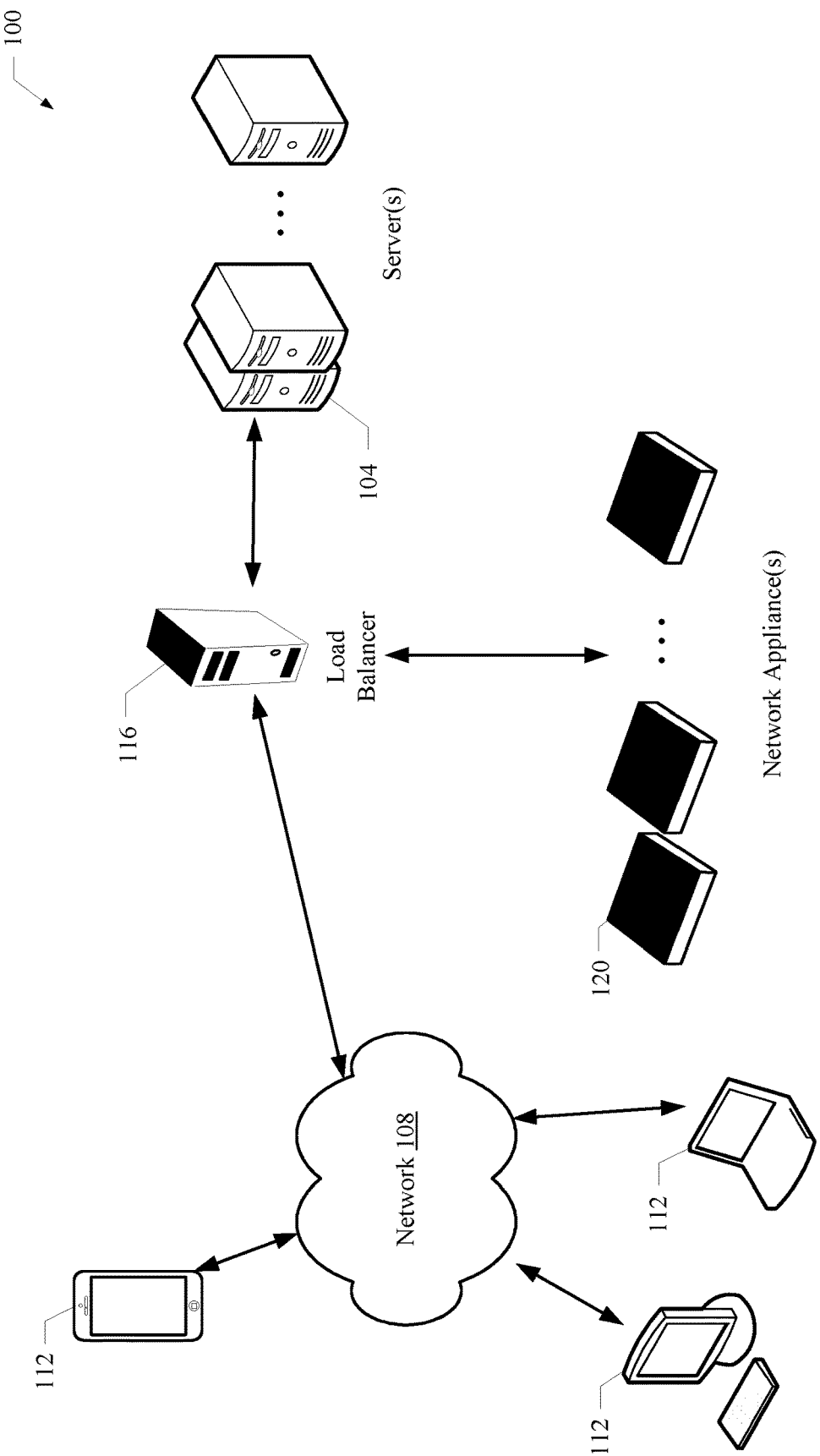
FIG. 1 is simplified diagram of a computing environment in which particular implementations enabled by the present disclosure may be practiced.

FIG. 1 illustrates an example of a computing environment 100 in which web page code is modified for the purpose of combatting MitB attacks. One or more servers 104 serve web pages via a network 108 to one or more client devices 112. Network 108 represents any subset or combination of a wide array of network environments, including the internet, public networks, private networks, local area networks, TCP/IP-based networks, telecommunications networks, wireless networks, cable networks, etc. Client devices 112 could be any device capable of requesting web pages served by server(s) 104. For instance, such devices might include a desktop computer, a laptop computer, a tablet, a smartphone, a set top box, a wearable device, etc.

A load balancer 116 acts as an intermediary between the servers 104 and the network 108, distributing source code (e.g., web pages served by servers 104) to one or more network appliances 120. The one or more network appliances 120 process at least a portion of the source code received, modifying the source code, as described below. Ultimately, the one or more network appliances 120 provide the modified source code to one or more client devices 112 via the load balancer 116 to the network 108.

Figure 2:
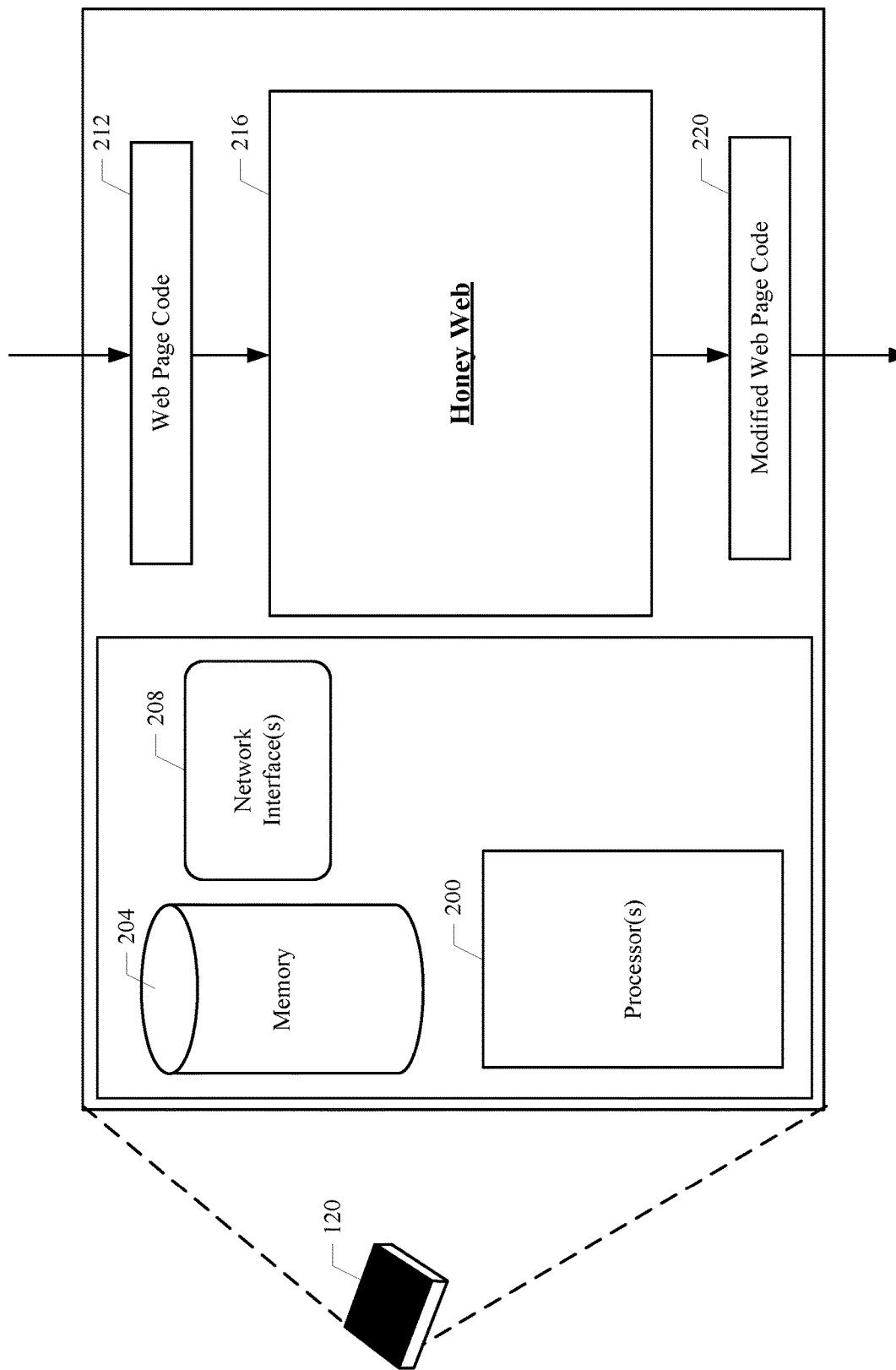
FIG. 2 is a simplified block diagram of a network appliance.

A simplified block diagram of such a network appliance 120 is shown in FIG. 2. Appliance 120 contains one or more processors 200, including one or more single or multi-core processors configured to execute stored instructions. Appliance 120 also includes one or more memories 204. Memory 204 comprises non-transitory computer-readable storage media that could potentially include a wide variety of forms of volatile and non-volatile storage media. For instance, memory 204 could include electronic storage media, magnetic storage media, optical storage media, quantum storage media, mechanical storage media, etc. Memory 204 provides storage for computer readable instructions, data structures, program modules and other data for the operation of appliance 120.

Appliance 120 also includes one or more network interfaces 208. The network interfaces 208 may be used to connect via wired or wireless connections to any of a variety of network types including, for example, cellular networks, wireless networks, the internet, public networks, private networks, wide area networks, local area networks, etc. In some implementations, appliance 120 might also include, network processors or network specific ASIC (Application-Specific Integrated Circuit) hardware chips.

Appliance 120 also includes one or more buses or other internal communications hardware or software (not shown) that allow for the transfer of data and instructions between the various modules and components of the appliance.

While appliance 120 might have many functions, this document focuses mainly on the use of appliance 120 to modify source code associated with a web page for the purpose of combatting MitB attacks. For example, appliance(s) 120 might function as web security appliances protecting servers 104. For example, appliance 120 might be a ShapeShifter® manufactured by Shape Security®, MWS1000® appliance manufactured by Juniper Networks®, or any of a wide variety of other web security products.

In one implementation, appliance 120 receives Web Page Code 212 associated with a web page through one or more network interfaces 208. The Input Web Page Code 212 is processed by Honey Web 216, which includes a series of modules that are described in greater detail below in the context of FIGS. 3 and 4. It will be understood that these and other modules may be implemented by processor(s) 200 executing code in memory 204.

After Web Page Code 212 is modified by Honey Web 216, Modified Web Page Code 220 is transmitted from the appliance 120 via the one or more network interfaces 208. In some implementations, Modified Web Page Code 220 is transmitted to a load balancer (e.g., load balancer 116 of FIG. 1) and then on to the requesting user device via a network (e.g., to one of devices 112 via network 108 as shown in FIG. 1). Alternatively, the Modified Web Page Code 220 might be transmitted directly to the user device. The Modified Web Page Code 220 may then be rendered as a web page in a browser on the user device.

It should be noted that, despite references to specific computing paradigms and software tools in this disclosure, the computer program instructions on which implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols in this disclosure are merely by way of example. Suitable alternatives known to those of skill in the art may be employed as appropriate for particular implementations.

Figure 3:
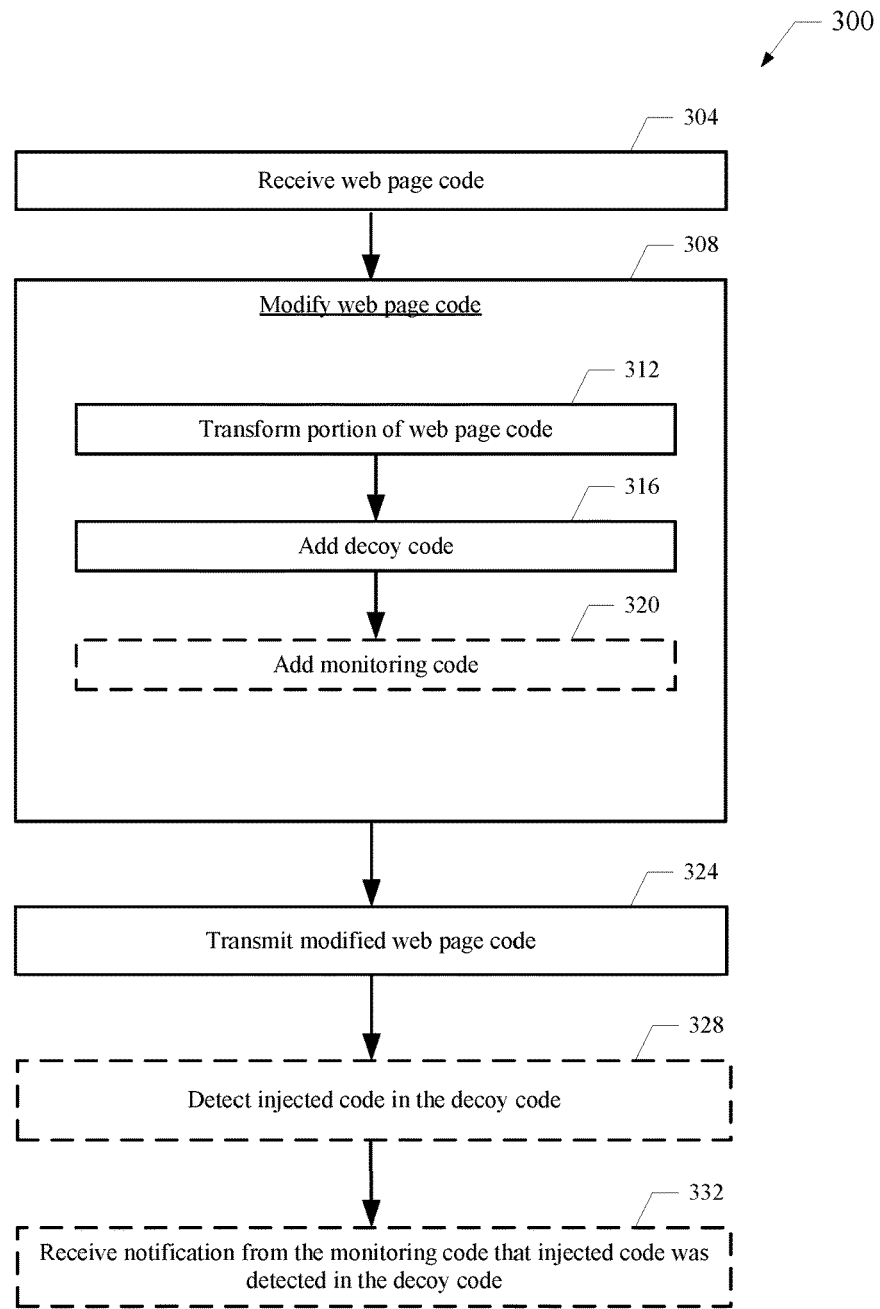
FIG. 3 is a flowchart illustrating the operation of a specific implementation in which web page code is modified to combat Man-in-the-Browser (MitB) attacks.

Referring now to FIG. 3, a particular example of a technique for modifying web page code to combat MitB attacks will be described. For illustrative purposes, the example of FIG. 3 is discussed in the context of computing environment 100 of FIG. 1. However, it should be noted that the techniques described are generally applicable to a wide variety of computing environments. It should also be noted that the example of FIG. 3 could be implemented in a variety of ways including, for instance, integrated with the operation of a network appliance such as, for example, appliance 120 described in the context of computing environment 100. Alternatively, modification of web page code as described herein might be implemented in another device (e.g., integrated with an originating web server or at an intermediate device such as a load balancer) or be distributed among multiple devices.

Web Page code representing a web page requested by a client device is received (304). The web page code can represent a web page requested by a client device, such as the login page for the banking website discussed above. The web page code can be received at network appliance 120 of FIG. 1 from Server(s) 104 by way of load balancer 116, as discussed above.

Figure 4:
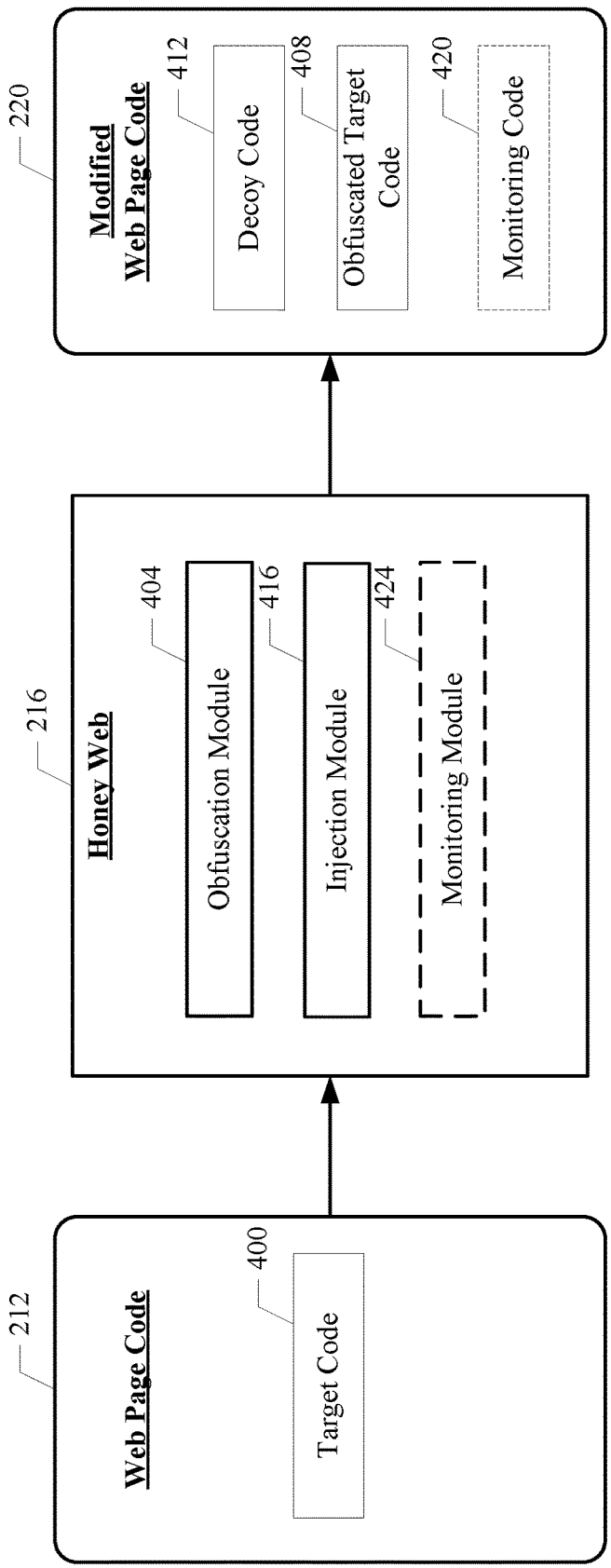
FIG. 4 is a simplified block diagram of an example of a system for modifying web page code to combat MitB attacks.

The web page code is modified (308). The modification of web page code can include a variety of steps, which can occur in a varying order. One such example is shown in 312-320 of FIG. 3 and is discussed below in the context of FIG. 4, which depicts a simplified block diagram of an example of a system for modifying web page code to combat MitB attacks. In FIG. 4, Web Page Code 212 is modified by the modules of Honey Web 216 of appliance 120 to produce Modified Web Page Code 220. Alternatively, the web page code modification process can be implemented across a variety of devices in a number of different computing environments, some of which are described below.

Returning to FIG. 3, a portion of the web page code is transformed (312). For example, as described above, a portion of the web page code that includes "target code" which might be vulnerable to MitB attacks can be obfuscated such that it is no longer detectible by the malware implementing the MitB attacks. For example, Target Code 400 can be transformed at Obfuscation Module 404 of FIG. 4 to produce Obfuscated Target Code 408.

Target Code 400 can include any web page code that could potentially be vulnerable to MitB attacks. Some examples of potentially vulnerable web page code may include code representing forms that request credentials or sensitive personal information such as login information, credit card information, a social security number, a signature, a digital signature, a credit card number, a Credit Card Verification (CCV) number, a bank account number, a Personal Identification Number (PIN), etc. Also or alternatively, potentially vulnerable web page code may include code representing seemingly harmless personal verification questions such as "What is your Mother's Maiden Name?", "In what city were you born?", etc. Potentially vulnerable web page code may also include code representing objects that request biometric information such as a retinal pattern or a fingerprint.

Additionally, potentially vulnerable web page code may include web page code that defines routing instructions for money transfers. By way of example, malware might target such code for injection to change an account number for money transfer such that a malicious third-party could re-route the transfer to him or herself.

One having skill in the art can appreciate that the types of web page code that are potentially vulnerable to MitB attacks might change over time as MitB attacks evolve. By way of example, many recent MitB attacks involve injecting code designed to create form fields to steal credentials or personal information, as described above. However, future MitB attacks may involve injecting code that is designed to achieve other malicious goals. Target Code 400 can be updated as MitB attacks evolve include any code that becomes vulnerable.

According to various implementations, the ways in which Obfuscation Module 404 transforms Target Code 400 may vary considerably. For example, obfuscation of Target Code 400 may be accomplished in accordance with techniques described in the following U.S. Patent Applications, each of which is incorporated herein by reference and forms part of this disclosure: U.S. patent application Ser. No. 14/055,646 for Protecting Against the Introduction of Alien Content filed on Oct. 16, 2013; U.S. patent application Ser. No. 14/055,704 for Safe Intelligent Content Modification filed on Oct. 16, 2013; U.S. patent application Ser. No. 14/286,733 for Polymorphic Treatment of Data Entered at Clients filed on May 23, 2014.

In one example of the obfuscation of Target Code 400, the field names of a form could be changed through a polymorphic transformation. Polymorphic transformation of web page code involves dynamically altering the ordinarily static source code associated with a web page. This makes the source code more difficult to exploit from the perspective of code-injecting malware while leaving web content viewable to the human user apparently unchanged. It should be noted that there are a number of ways to transform web page source code without changing the web page's appearance to a user. For instance, a variable (e.g., "user_name") describing an inputted username could be changed from "user_name" to a random string (e.g., "n2qi87fpr3wr"). In another example, the layers of a form field from which a username is gathered could be changed. Instead of taking all of the user name characters from a single field, the first and third characters might be entered in one field, the second character in another, etc. If the fields are overlaid in the user interface, a user cannot tell the difference between a representation of a website where all username characters are gathered from a single field and a representation where the characters are gathered from multiple overlaid fields.

A purpose of such polymorphic transformations is to create a moving target so that malicious code executing on a browser of a client device cannot use predictability of code in order to interact with the code in a malicious way. Ultimately, the process of obfuscation through polymorphic transformation of web page code can vary greatly from implementation to implementation. Further examples may be found with reference to U.S. application Ser. No. 14/055,704, U.S. application Ser. No. 14/055,646, and U.S. patent application Ser. No. 14/286,733 incorporated herein by reference above.

In another example, Obfuscation Module 404 can rewrite Target Code 400 to have a different structure (e.g., changing HTML clear text to JavaScript, etc.). Further description of rewriting target code to have a different structure can be found in a paper by Xinran Wang, Tadayoshi Kohno, and Bob Blakley entitled *Polymorphism as a Defense for Automated Attack of Websites*, Applied Cryptography and Network Security (2014), the entirety of which is incorporated herein by reference for all purposes and forms part of this disclosure.

It will be understood that obfuscation techniques evolve over time and an obfuscation module can be configured to execute the above-described obfuscation techniques and other existing obfuscation techniques, as well as yet-to-be conceived obfuscation techniques. Suitable variations will be apparent to those of skill in the art.

Returning to FIG. 3, decoy code is added to the web page code (316). For example, as shown in FIG. 4, Decoy Code 412 can be added to Web Page Code 212 at Injection Module 416. Unlike Obfuscated Target Code 408 which is rendered by a browser and presented to a user, Decoy Code 412 is not presented to a user. Therefore, as discussed above, Decoy Code 412 can form part of a honey object that is designed to be recognized by malware as a target code injection point. Since a representation of Decoy Code 412 is not presented to a user, any malicious code injected into Decoy Code 412 is quarantined and rendered harmless.

Honey objects, and decoy code included within honey objects, may be designed with reference to the specific configurations of known malware, e.g., by examining detected malware code and identifying the target code the malware is designed to exploit. Honey objects can also be designed using a more heuristic approach in which common attack vectors are taken into account. For example, MitB malware commonly employs login pages as points of attack. Decoy code may therefore be configured to appear as one or more of the forms of a login page with the actual forms being included in code which is obfuscated and/or moved elsewhere, as described above.

While decoy code is designed to attract the attention of malware residing on a client device, its presence is preferably transparent to the end user of that device, as described above. Decoy code can be made transparent to an end user of a client device in a variety of ways. By way of example, Decoy Code 412 of FIG. 4 can be injected in the Hyper Text Mark-up Language (HTML) comments section of Modified Web Page Code 220 where it will be ignored by a browser of a client device, but still attract any malware looking for its target code. Also or alternatively, by properly setting a Cascading Style Sheets (CSS) style (e.g. display=None), Decoy Code 412 can be placed inside a div or iframe that is not displayed when Modified Web Page Code 220 is rendered by a browser on a client device. Similarly, Decoy Code 412 can be placed in a single square pixel div that would likely be too small to be detected by a healthy human eye on a conventional display.

Decoy code can also be made transparent to an end user of a client device by causing a representation of decoy code to be presented outside of the screen of a client device when rendered by a browser on the client device. By way of example, Decoy Code 412 can be represented at the bottom of a web page and can be configured to continue moving down as a user scrolls downwards when navigating the web page. Also or alternatively, Decoy Code 412 can be placed behind other objects in a web page, such as images or over-lapping form elements. Other suitable variations will be apparent to those of skill in the art.

An example of a honey object including decoy code that is placed inside a div that is not displayed when rendered by a browser on a client device is shown below:

<div id="honeydiv" style="display=none">
<input name='password' id='password' type='password'>
</div>

The above example of decoy code is configured to attract malware that targets the string "<input name='password' id='password' type='password'>"

As will be appreciated, it is desirable that insertion of Decoy Code 412 of FIG. 4 not interfere with the functionality of Modified Web Page Code 220 when Modified Web Page Code 220 is rendered on a browser of a client device. For example, as shown above, Decoy Code 412 may introduce an element with an ID of "password", which may also appear in Obfuscated Target Code 408. In this case, there would be two elements with an ID of "password" in the Document Object Model (DOM) of the web page represented by Modified Web Page Code 220. Consequently, an error due to undefined behavior might occur when JavaScript calls document.getElementById ("password"), since there would be two elements with an ID of "password" in the DOM of the web page.

Such interference may be avoided in a variety ways. For example, as described above, Decoy Code 412 can be placed in the HTML comments section of a web page. In this scenario, Decoy Code 412 will not interfere with the functionality of the web page because the content of the HTML comments section does not affect the DOM of the web page.

Also or alternatively, interference may be avoided by using a dynamic ID. By way of example, the honey object shown below avoids interference caused by a duplicated ID with the addition of a simple JavaScript (bolded and underlined):

<div id="honeydiv" style="display=none">
<input name='password' id='password' type='password'>
</div>
<script type="text/javascript">
document.getElementById('password').id="xxxx"
</script>

The addition of the above JavaScript changes the ID of "password" in the honey object, thereby avoiding the interference of two elements in the DOM of the web page having an ID of "password."

Returning to FIG. 3, in some implementations, monitoring code is added to the web page code (320). For example, Monitoring Code 420 of FIG. 4 can be injected into Modified Web Page Code 220 at Monitoring Module 424. Monitoring Code 420 can include JavaScript code that is configured to detect when malicious code is injected into Decoy Code 412. For example, Monitoring Code 420 can include JavaScript that can analyze elements of Decoy Code 412 to perform a code comparison to detect elements that are present in decoy code as it exists on a client device but not in original Decoy Code 412 that was added to Web Page Code 212 at 316 of FIG. 3. For instance, Monitoring Code 420 can be configured to read the static content of Decoy Code 412 (e.g. via object.innerHTML) and DOM elements of Modified Web Page Code 220. As discussed above, an end user of a client device is unlikely to interact with decoy code as it exists on the client device because is made transparent to the end user of the client device. Therefore any elements that are present in decoy code as it exists on the client device but are not present in original Decoy Code 412 added at 316 of FIG. 3 are likely to have been maliciously injected by malware.

Also or alternatively Monitoring Code 420 may include a JavaScript event listener configured to send an event to Monitoring Module 424 if Decoy Code 412 is modified. By way of example, if JavaScript is used to inject malicious code into Decoy Code 412 on a client device, the browser of the client device will automatically generate a modification event. Monitoring Code 420 can pick up these events and send a notification to Monitoring Module 424.

Monitoring code can be configured to detect insertion of malicious code at a variety of times. For example, Monitoring Code 420 can be configured to run whenever the web page associated with Modified Web Page Code 220 is loaded. Also or alternatively, Monitoring Code 420 can be configured to run periodically, e.g. every few seconds.

Various techniques can be used to ensure that monitoring code is not detected by malware. By way of example, monitoring code can be obfuscated, using obfuscation techniques described above. Alternatively, in order to avoid detection by malware, monitoring for injections of malicious code need not be performed on a client device. By way of example, a client device can periodically send samples of web page code that is being rendered on the client device to Monitoring Module 424. A code comparison can be performed at Monitoring Module 424 and injected code in the samples of web page code can be detected, as described below.

Returning to FIG. 3, the web page code modified at 312-320 is transmitted to the client device (324). For instance, Modified Web Page Code 220 of FIG. 4 might represent the login page of the banking website, discussed above, and might be transmitted for rendering in a browser on a customer's smart phone.

According to some implementations, injected code is detected in the decoy code (328). Injected code can be detected in a variety of ways. For instance, Monitoring Code 420 can detect injected code using the code comparison and/or event listening techniques described above. As discussed below in the context of 332 of FIG. 3, a client device can send a notification to Monitoring Module 424 whenever Monitoring Code 420 detects injected code on the client device.

In some implementations, a monitoring module located on a server or network device can detect when malicious code is injected into decoy code even if monitoring code is not operating on a client device. By way of example, Monitoring Module 424, can store an original reference version of Decoy Code 412 and can be configured to periodically receive samples of decoy code from a client device of web page code that is being rendered on the client device. Monitoring Module 424 can perform a standard code comparison between the sample decoy code in and the original reference version of Decoy Code 412. Monitoring Module 424 can identify any code that is present in the sample decoy code, but not present in the original reference version of Decoy Code 412. Therefore, Monitoring Module 424 can be used to detect malicious injected code, even if monitoring code is not operating on a client device.

According to some implementations, a notification is received that injected code was detected in the decoy code (332). For instance, such a notification can be received at Monitoring Module 424 of FIG. 4 from Monitoring Code 420. By way of example, injection of malicious code can be detected by Monitoring Code 420 operating on a client device at 328 of FIG. 3. Asynchronized data transfer (e.g., ajax POSTs) can be used to send an alert indicating the detection of injected code to Monitoring Module 424. Meanwhile, an end user of the client device can be alerted of the detection of injected code by way of a pop up message presented on a display of the client device.

Also or alternatively, in response to receiving the alert indicating the detection of injected code, Monitoring Module 424 can alert the appropriate authorities (e.g. law enforcement authorities and/or the entity in charge of the web page associated with Web Page Code 212) of the detection of injected code. Along these lines, the appropriate authorities can also be notified of the identity of the user of the client device, so they can ensure that sensitive information has not been stolen or otherwise take appropriate action.

Figure 5:
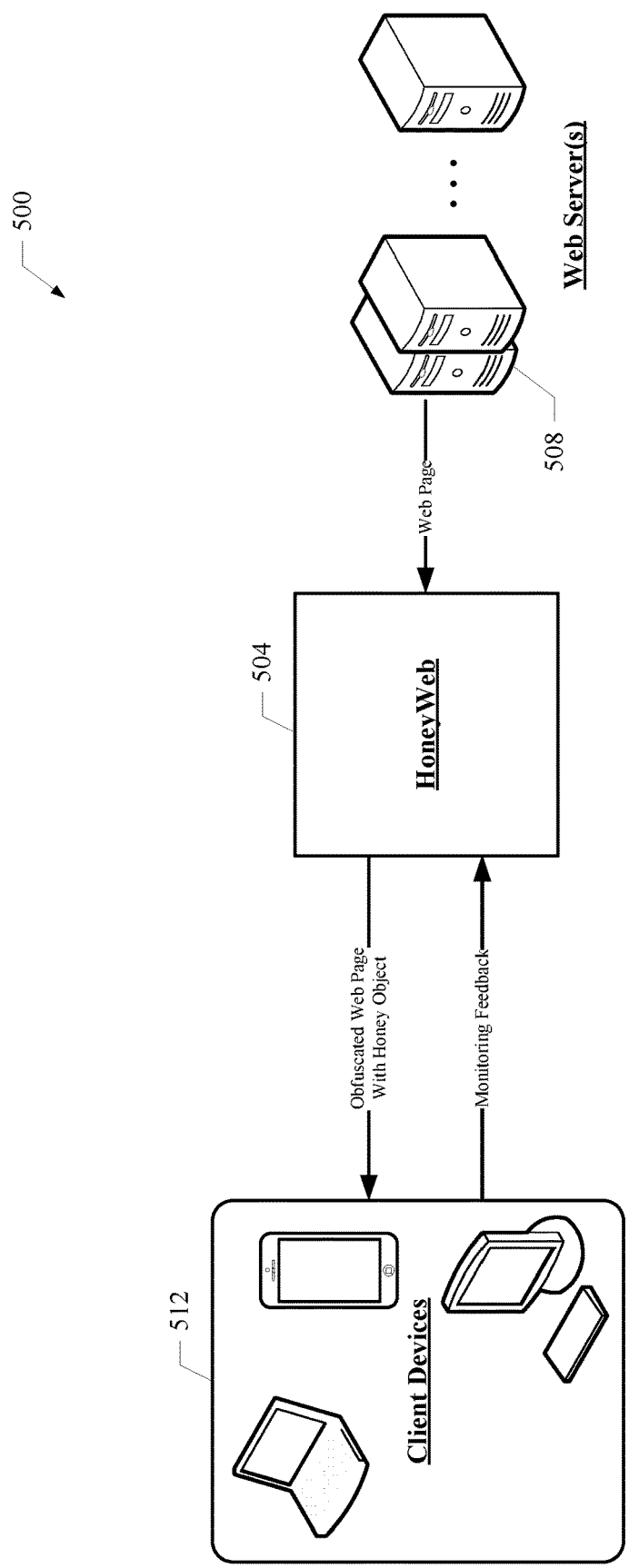
FIG. 5 is a simplified diagram of a computing environment in which particular implementations enabled by the present disclosure may be practiced.

One having skill in the art would appreciate that the disclosed techniques can be applied in a diverse array of computing environments in a variety of context. For instance, FIG. 5 shows an example of a computing environment 500 where Honey Web 504 acts as a reverse proxy mediating communication between web servers 508 and client devices 512. Honey Web 504 can include some or all of the modules of Honey Web 216 depicted in FIG. 4. Honey Web 504 can reside in a variety of places such as on one or more physical and/or virtual servers. As will be understood, the depicted devices represent a much greater diversity of device types that might be included in computing environment 500. And like network 108 of FIG. 1, computing environment 500 can represent any subset or combination of a wide array of network environments, including the internet, public networks, private networks, local area networks, TCP/IP-based networks, telecommunications networks, wireless networks, cable networks, etc. Computing environment 500 can optionally include a wide variety of client devices 512 such as desktop computers, laptop computers, tablets, smartphones, set top boxes, wearable computing devices, etc.

In another useful application of the disclosed techniques, automated malware signature extraction can be used to keep up with evolving MitB attacks. By way of example, an automatic signature extraction system such as Zarathustra can be used to periodically extract signatures from malware. The modules of Honey Web 216 of FIG. 4 can be updated with such information so that Target Code 400 corresponding to the periodically extracted malware signatures can be obfuscated in Obfuscation Module 404 and Decoy Code 412 can be injected at Injection Module 416, using the techniques described above.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

The invention claimed is:

1. A method, comprising:
generating modified web page code for transmission to a client device by:
adding first code comprising decoy code to web page code, wherein the decoy code is designed to be recognized by malware as web code that is vulnerable to attack;
adding second code to the web page code, wherein the second code is configured to transmit data regarding the decoy code at the client device;
receiving one or more communications generated by the second code executing at the client device;
based on the one or more communications, determining that malicious code has interacted with the modified web page code at the client device;
wherein the method is performed by one or more computing devices.

2. The method of claim 1, wherein the one or more communications indicate that the malicious code has interacted with the modified web page code.

3. The method of claim 2, wherein the second code, when executed at the client device, code detects and reports an interaction between malware and the decoy code.

4. The method of claim 2, wherein the second code, when executed at the client device, analyzes elements of the decoy code at the client device for comparison to decoy code as originally provided to the client device.

5. The method of claim 1, wherein the second code, when executed at the client device, periodically transmits one or more samples comprising at least a portion of the decoy code at the client device.

6. The method of claim 5, further comprising performing a comparison of the one or more samples and the decoy code as originally provided to the client device, wherein determining that malicious code has interacted with the modified web page code is based on the comparison.

7. The method of claim 1, further comprising updating the decoy code for subsequent client devices after receiving new information about malware vulnerabilities.

8. The method of claim 1, wherein the decoy code is not rendered in a displayed area by a browser executing on the client device.

9. The method of claim 1, wherein the decoy code is configured to render the interaction between the malicious code and the decoy code harmless.

10. The method of claim 1, wherein the decoy code includes a dynamic ID.

11. A system, comprising:
one or more hardware processors;
memory coupled to the one or more hardware processors and storing one or more instructions which, when executed by the one or more hardware processors, cause the one or more hardware processors to:
generate modified web page code for transmission to a client device by:
adding first code comprising decoy code to web page code, wherein the decoy code is designed to be recognized by malware as web code that is vulnerable to attack;
adding second code to the web page code, wherein the second code is configured to transmit data regarding the decoy code at the client device;
receive one or more communications generated by the second code executing at the client device;
based on the one or more communications, determine that malicious code has interacted with the modified web page code at the client device.

12. The system of claim 11, wherein the one or more communications indicate that the malicious code has interacted with the modified web page code.

13. The system of claim 12, wherein the second code, when executed at the client device, code detects and reports an interaction between malware and the decoy code.

14. The system of claim 12, wherein the second code, when executed at the client device, analyzes elements of the decoy code at the client device for comparison to decoy code as originally provided to the client device.

15. The system of claim 11, wherein the second code, when executed at the client device, periodically transmits one or more samples comprising at least a portion of the decoy code at the client device.

16. The system of claim 15, wherein the one or more instructions, when executed by the one or more hardware processors, further cause the one or more hardware processors to:
perform a comparison of the one or more samples and the decoy code as originally provided to the client device, wherein determining that malicious code has interacted with the modified web page code is based on the comparison.

17. The system of claim 11, wherein the one or more instructions, when executed by the one or more hardware processors, further cause the one or more hardware processors to:
update the decoy code for subsequent client devices after receiving new information about malware vulnerabilities.

18. The system of claim 11, wherein the decoy code is not rendered in a displayed area by a browser executing on the client device.

19. The system of claim 11, wherein the decoy code is configured to render the interaction between the malicious code and the decoy code harmless.

20. The system of claim 11, wherein the decoy code includes a dynamic ID.

* * * * *